W. GROSSKOPF.
BAND SAW FILING AND SETTING MACHINE.
APPLICATION FILED DEC. 21, 1908.
934,967.
Patented Sept. 21, 1909.
3 SHEETS—SHEET 2.
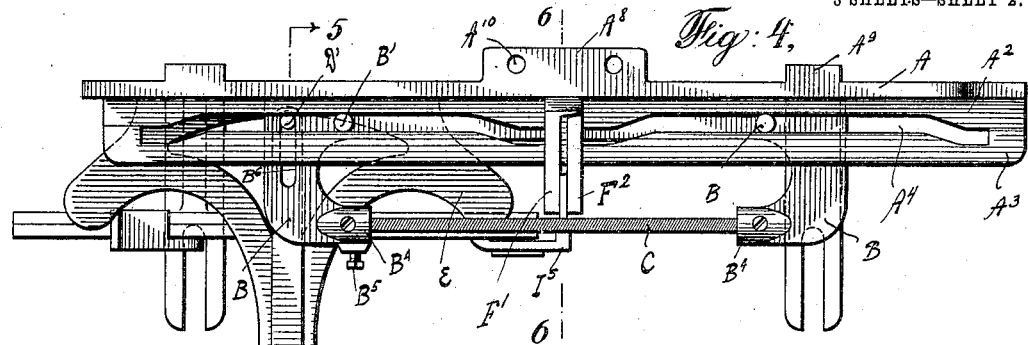
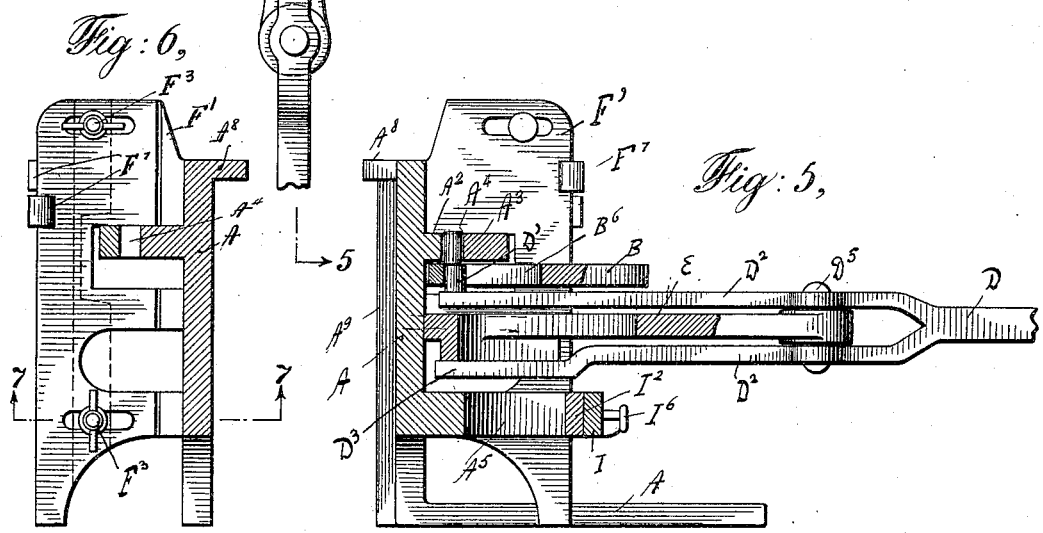
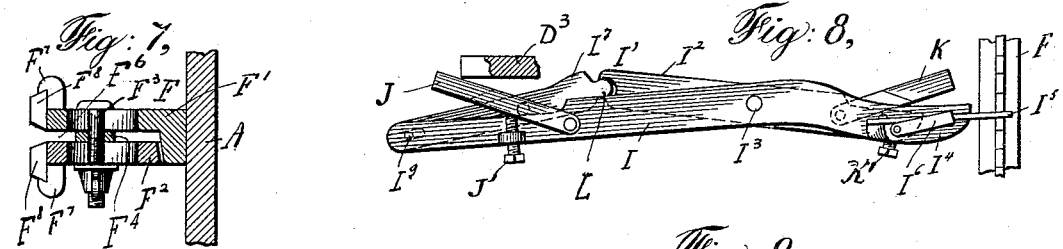
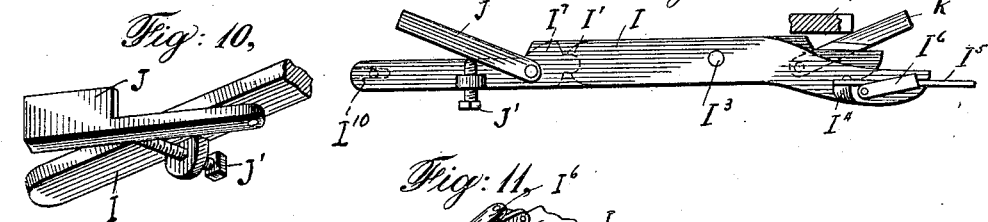
Witnesses:
M. Gaertner.
J. Luttinger.
Inventor
William Grosskopf
By his Attorney

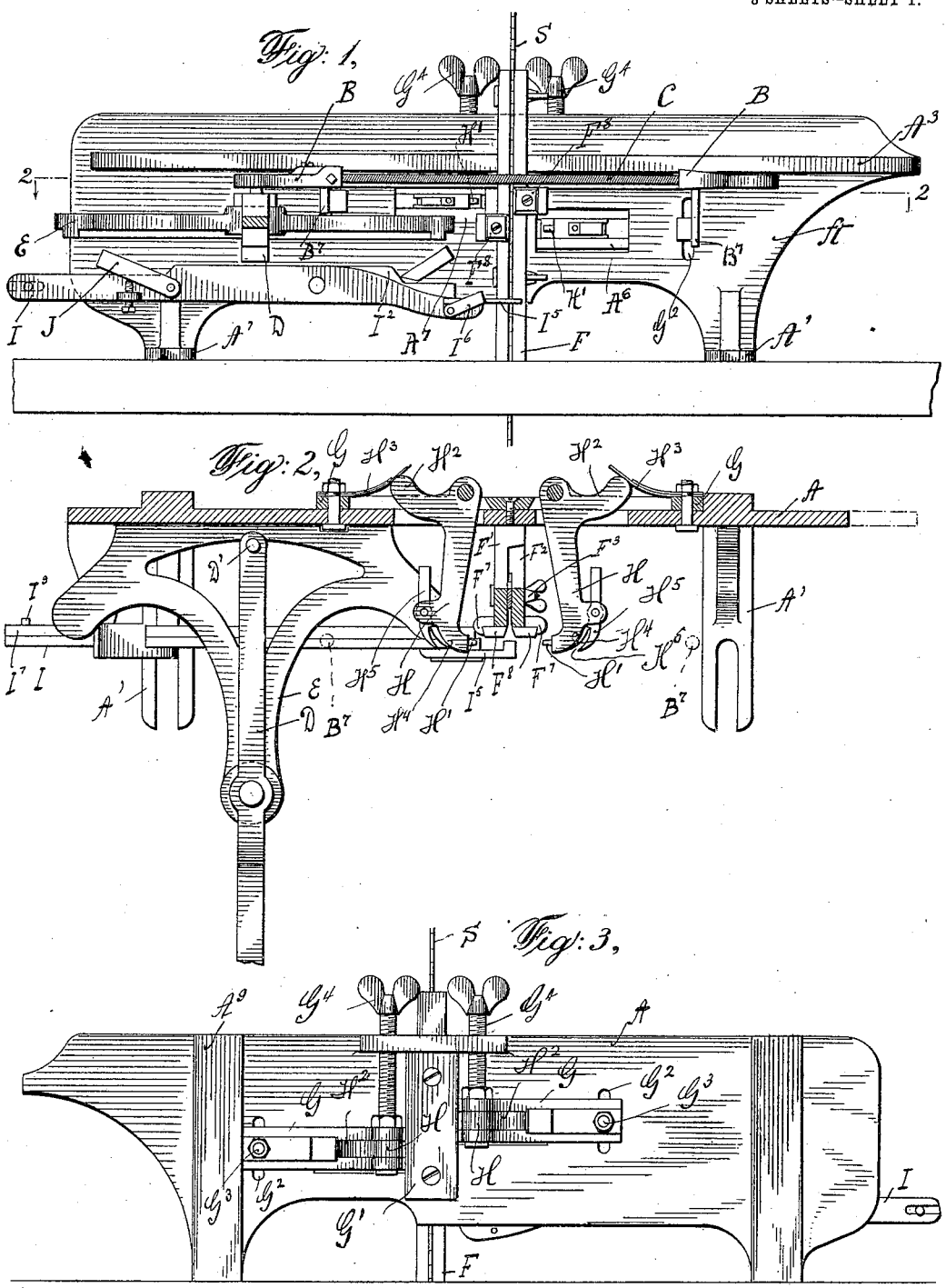

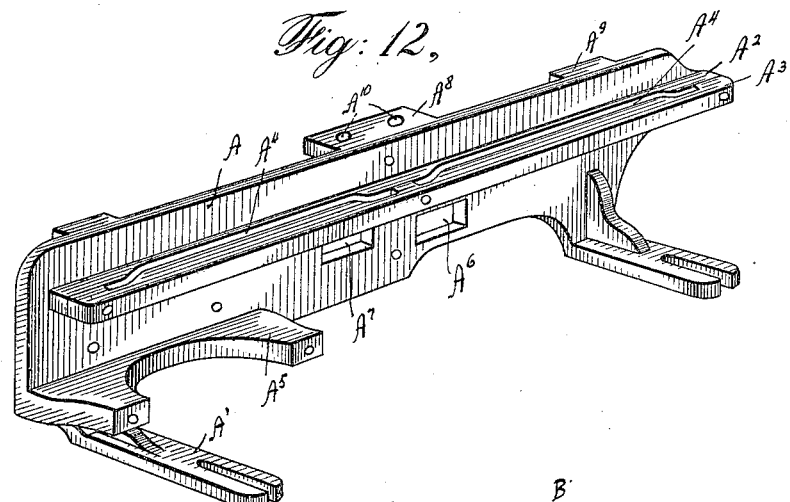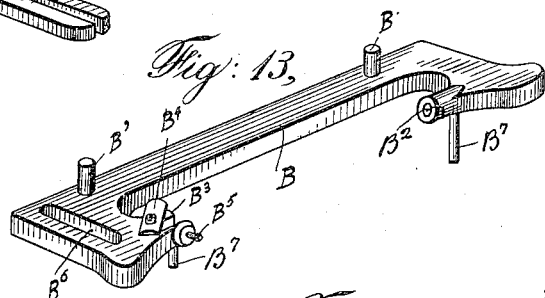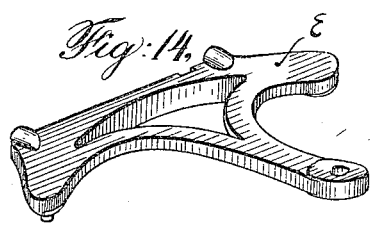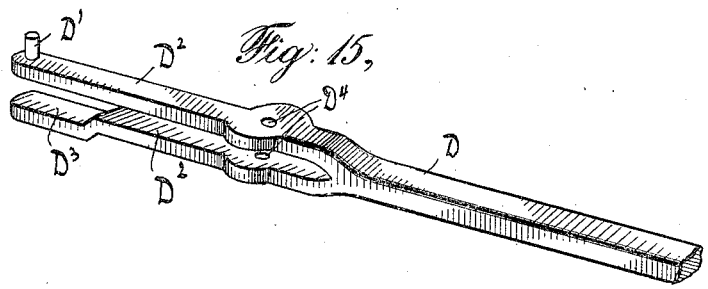

UNITED STATES PATENT OFFICE.

WILLIAM GROSSKOPF, OF NEW YORK, N. Y.

BAND-SAW FILING AND SETTING MACHINE.

934,967. Specification of Letters Patent. Patented Sept. 21, 1909.

Original application filed February 12, 1906, Serial No. 300,701. Divided and this application filed December 21, 1908. Serial No. 468,538.

*To all whom it may concern:*

Be it known that I, WILLIAM GROSSKOPF, a citizen of the United States, residing at New York, in the county of New York and State of New York, have invented certain new and useful Improvements in Band-Saw Filing and Setting Machines, of which the following is a specification.

My invention relates to an improved band saw filing and setting machine, and has for its object to provide a simple, durable and compact machine for filing and setting the teeth of band saws without removing the latter from its supports, and also for automatically feeding the saw, one tooth at a time, and holding it in position while being operated upon by the cutting tool.

A further object of the invention is to provide an arrangement for regulating the feeding device to accommodate the machine to various kinds and sizes of saws.

A still further object is to provide a machine in which each complete movement of the cutting tool operates upon a single tooth, thus utilizing each movement of the tool and consequently avoiding all lost motion.

A further object is to provide an arrangement in which the cutting tool is elevated so that the saw-blade may be fed through the machine, which operation takes place at the end of the stroke of the cutting tool.

With these briefly stated objects in view, the invention comprises a frame having a reciprocating carriage carrying a cutting tool, preferably a three-cornered file, the said carriage being operated by a lever pivotally mounted upon the frame, and which is also employed for operating feeding devices for moving the saw through the machine and punches for setting the teeth after they have been operated upon by the cutting tool, the cutter, punches and feeding devices being operated at each throw of the lever so that no unnecessary or lost motion of the parts results.

The invention further comprises certain details of construction and peculiar combination and arrangement of parts, as will be fully set forth in the following specification and pointed out in the claims, reference being had to the drawings in which:—

Figure 1 is a front view of the machine; Fig. 2 is a sectional plan view of the same drawn on the line 2—2 of Fig. 1 and illustrating the operation of the setting device; Fig. 3 is a rear view of the machine; Fig. 4 is a plan view of the machine, the setting mechanism being omitted; Fig. 5 is a detail vertical section drawn on the line 5—5 of Fig. 4; Fig. 6 is a detail vertical section drawn on the line 6—6 of Fig. 4; Fig. 7 is a cross section on line 7—7 of Fig. 6; Figs. 8 and 9 are detail sectional plan views illustrating the feeding device, in these views the extreme end of the lever being shown operating upon the feeding device; Fig. 10 is a detail perspective view illustrating one of the adjustable cam surfaces by which the length of the movement of the feeding device is regulated; Fig. 11 is a detail perspective view illustrating the finger of the feeding device that engages the teeth of the saw; Fig. 12 is a detail perspective view of the base-plate of the frame, illustrating the guides or race-ways for controlling the movement of the reciprocating carriage; Fig. 13 is a detail perspective view of the carriage, the cutting tool or file being removed; Fig. 14 is a detail perspective view of an extension of the frame to which the lever is pivotally connected; Fig. 15 is a detail perspective view of the lever.

In the drawings A designates the vertically disposed base-plate of the frame having foot-portions A' projecting therefrom, by which the frame is adapted to be securely held to the bed of a sawing machine. The foot-portions are slotted for the passage of thumb screws which are to be screwed into the bed. Projecting from the face of the base-plate is an integral flange $A^2$, upon which fits a bar $A^3$, which is held slightly away from the face of the flange by providing its ends and its central portion with lugs that engage the edge of the flange and by which two guide slots $A^4$ are produced, the said slots extending forwardly from the base-plate at their ends for the purpose as will be explained later on (Figs. 1, 4 and 12).

Operating in each guide slot is a stud-bolt or pin B' projecting from a carriage B (Figs. 1, 4 and 13), that is designed to slide back and forth. This carriage has a bore $B^2$ at one end and a socket $B^3$ at its opposite end, in which is held a file-blade C, preferably of the three-cornered style. The socket $B^3$ is adapted to be closed by a plate $B^4$ secured to the carriage and operating through the edge of the carriage is a clamping nut B⁵, by which the file is securely held in position. One end of the carriage is provided with an elongated slot B⁶ into which projects a pin or stud-bolt D′ extending from the end of one of the forked members D² of an operating lever D. The latter is at D⁴ pivotally held to a frame E projecting from the base-plate and whose base forms a guide for the ends of the lever. It will thus be seen that by moving the handle end of the lever back and forth, the carriage will be reciprocated across the face of the base-plate, and by providing the guide slots A⁴ with irregular ends, the carriage will be elevated at the end of each stroke.

Held upon the face of the base-plate A is a guide block F, comprising a rigid portion F′ and a movable plate F² that is held to the rigid portions by bolts and thumb-nuts F³, operating through slots in each member of the guide block F. The said movable plate is spaced from the rigid portion by a washer plate F⁴ providing a guide-slot F⁶, through which the saw S passes. The washer plate forms the double purpose of providing a base against which the rear edge of the saw engages and also for producing the guide slot, and by moving the washer plate F⁴ back and forth in the guide slot, the machine is capable of operation upon different widths of saws.

Secured to the rear surface of the frame A to be capable of adjustment in vertical direction are recessed blocks or frames G, one on each side of the block F. These frames are vertically displaced to one another and are guided during their vertical adjustment at one end by vertical bar G′ and at their opposite ends by a bar A⁹ or vertical slots G² made in the frame A and engaging bolts G³. These frames G are suspended from thumb screws G⁴ working in a flange G⁵ of the base or frame A. Hinged in these blocks or frames G and projecting forwardly through recesses A⁶, A⁷ in the frame A are arms H carrying at their free ends punches H′. At the ends adjacent to the hinge portion said arms have rounded projections H² against which rest plate springs H³ secured in the frames G, which springs have the tension to swing the arms inward or toward the block F. The portion H⁴ of the arms near the punches H′ is rounded and carries a spring actuated rounded catch H⁵. Projecting downward from each outer end of the carriage B is a pin B⁷ which at the end of each stroke of the carriage movement will be allowed to pass over the rounded surface of the catch H⁵ and the portion H⁴ of the arm H, but upon the reverse movement of the carriage will enter the space H⁶ between the arm and the catch H⁵, and in engaging the latter will swing the arm away from the block F against the tension of the spring H³. When the carriage has moved sufficiently in this reverse direction, the pin B⁷ will escape from the catch H⁵ releasing the arm H, that by the force of its spring H³ will be vigorously thrust toward the block F. Each member of the guide-block F is provided with a lateral projection F⁷ having its ends under-cut and adapted to receive the beveled sides of die-plates F⁸, that are held in position by screws. These lateral projections and die-plates are vertically displaced to one another and arranged upon the guide-block opposite the ends of the punches H′ as shown most clearly in Fig. 2 of the drawing.

In order to move the saw through the guide block after the teeth have been operated upon by the cutting tool or file blade, I employ a feeding device, as best illustrated in Figs. 1, 8 and 9 of the drawings and from which it will be seen, I employ a solid lever-bar I and a sectional lever I′. The solid lever-bar I and one section I² of the sectional lever I′ are held upon a common pivotal point I³ which projects from an extension A⁵ of the base A. From the inner end of the lever I projects a flange I⁴ having a finger I⁵ pivotally held thereto and whose free end projects beyond the lever over the edge of the saw S and engages the teeth thereof, the said finger being yieldingly held against the teeth by a leaf-spring I⁶. The opposite end of the lever is provided with a cam-block J, pivotally held to the lever at J² and adjustable away from the lever by an adjusting screw J′ which operates through a boss carried by the lever I. Upon the inner end of the member I² of the sectional lever I′ a similar cam block K is provided, that is adjusted by an adjusting screw K′. The opposite member I⁷ of the sectional lever is pivotally held to the extension A⁵ of the base and is connected to the member I² by a knuckle-joint L and to the solid lever I by means of a pin I⁹ projecting from the section I, and through a slot I¹⁰ produced in the outer end of the member I⁷. The cam blocks J and K are designed for engagement by the inner end D³ of one of the forked members D² of the operating lever D as the latter is moved back and forth. The operation of this feature will be clearly understood from the general description of the operation of the machine which is as follows: After the machine has been set in position, the cutting tool or file C is arranged in the carriage and adjusted so that it will lie snugly against one tooth of the saw. Then by grasping the handle of the lever and rocking it back and forth, the carriage will be reciprocated across the base, causing the full length of the file to operate against the saw. At the completion of a stroke during the movement of the carriage in one direction, one of the pins B⁷ of the carriage will be brought in contact and caused to pass over the rounded catch H⁵ and the portion H⁴ of one of the arms H. When the movement of the carriage is reversed, this pin will enter the space H⁶ and be caught by the catch H⁵, whereby the arm H as the reverse movement of the carriage continues, will be swung away from the block F against the tension of the spring H³, until the pin B⁷ will be allowed to escape the catch H⁵. At this moment the released arm H will be vigorously thrust against the tooth of the saw lying opposite one of the die-plates F⁸ and set the same. When the carriage has reached the end of each stroke, the pins B' will slide up into the irregular ends of the guide slots C which elevates the carriage and moves the file or cutting tool away from the saw and after this movement the surface D³ of the operating lever D will engage one of the cam blocks J or K and feed the saw through the guide, the distance of one tooth. To clearly illustrate this feature, we will refer to Fig. 8 and assume that the carriage has been moved to the left-hand end of the machine. It will be seen that the lever has engaged the guide-block J, and the outer end of the lever I has been moved downwardly which throws the opposite end upwardly and by reason of the finger I⁵ engaging the vertical edge of the saw-tooth, the saw will be fed the distance of one tooth through the guide. As the outer end of the lever is moved downwardly, the meeting ends of the sectional lever I' will be thrown upwardly into the path of the end D³ of the operating lever D. Upon the reverse movement of the latter the end D³ will engage the jointed ends of the sectional lever, the member I⁷ will be rocked upon its pivot moving the outer end upwardly, and as it is connected to the lever I the outer end of the latter will also be moved upwardly and of course its opposite end downwardly. At this movement the fingers I⁵ will slip over the next tooth and be forced over the same by the leaf-spring I⁶. When the jointed end of the sectional lever is operated upon, as just described, the inner end of the section I² will be elevated throwing the block K into the path of the section D³ of the operating lever, as shown in Fig. 9 of the drawing, and upon a further movement of the operating lever, the inner end carrying the finger I⁵ will be moved downwardly and the finger adjusted back of the next tooth. Then upon the reverse movement the lever will be operated as before described, and the saw moved another tooth at the end of each stroke of the lever and of the reciprocating carriage. Of course it will be understood that both arms carrying the punches are operated in the same manner as the arm previously described.

From the foregoing it will be seen that I provide an exceedingly cheap, simple and highly efficient device for the purpose stated, and while I have shown and described my machine to be used for sharpening and setting a band-saw, it will of course be understood that the machine may be used for sharpening and setting other saw-blades, and when used upon ordinary hand-saws, the frame is tilted so that the base-plate will lie upon a bench or table.

Having thus fully described my invention, what I claim as new and desire to secure by Letters Patent is:—

1. In a machine of the character described, the combination with a frame having guide slots, the ends of which are arranged in different planes from the central portion of the slots, of a tool carriage mounted upon the frame and having pins projecting into the said slots, a lever pivotally held upon the frame and connected with the said carriage, a saw-guide mounted upon the frame, a feeding device and means on said feeding device coöperating with said lever, whereby the feeding device is operated by and at the end of each stroke of the lever.

2. In a machine of the character described, the combination with a frame having guide slots, the ends of which are arranged in different planes with respect to the central portion of the slots, and a saw guide carried by the frame, of a carriage mounted upon the frame and having pins or projections extending into the guide slots, a cutting tool held in the carriage, a lever for operating the carriage, and a feeding device operated by the lever, said feeding device having a cam adjustably held at each end, which cams are engaged by the end of the said operating lever.

3. In a machine of the character described, the combination with a base having a saw-guide, of a reciprocating tool carriage mounted upon the frame, a lever for operating the carriage, and a feeding device operated by the lever, said feeding device comprising a rigid lever bar and a sectional lever-bar, one end of the rigid bar having a yielding finger that is adapted for engagement with the teeth of a saw and its opposite end provided with an adjustable cam-block, the said rigid lever being connected to one member of the sectional lever and the opposite member of the sectional lever having an adjustable cam block, said blocks and sectional lever being engaged by the operating lever, substantially as specified.

4. In a machine of the character described, the combination with a base having a saw-guide and guide slots, of a tool carriage having pins that extend into the said slots, a guide frame extending from the first mentioned frame, a lever pivotally held upon the guide-frame, said lever having its inner end bifurcated and one member provided with a pin that extends into a slot produced in one end of the said tool carriage, and a feeding device having adjustable cam blocks that are engaged by the opposite bifurcated member of the lever, all substantially as specified.

5. In a machine of the character described, the combination with a base having a saw-guide and guide slots, the ends of the said slots being projected outwardly from the base and from the central portion of the slots, of a reciprocating carriage mounted upon the frame and having projections extending into the said slots, an operating lever, a cutting tool carried by the frame and extending over the face of the saw-guide, an operating lever connected to the carriage, for moving it back and forth across the frame, said carriage being adapted to be moved outwardly from the said frame at the end of each movement thereof, and a feeding device operated by the lever, all substantially as specified.

6. In a machine of the character described, the combination with a base having a saw-guide and guide slots, of a reciprocating carriage mounted upon the frame and having extensions projecting into the slots, a lever for operating the carriage, and a feeding device mounted upon the frame and operated by the lever, said feeding device comprising a rigid and sectional levers, the said rigid lever and one member of the sectional lever being held upon a common pivot, the opposite member of the sectional lever being held upon a separate pivot and connected at one end to the opposite member by a knuckle-joint and at its opposite end joined to the rigid member by a pin which extends from the rigid member and into a slot of the said member of the sectional lever, an adjustable cam block carried by the rigid lever, and an adjustable block carried by one member of the sectional lever, and a yielding finger carried by the rigid lever, the said cam blocks and sectional lever being adapted for engagement by the operating lever, all substantially as and for the purpose specified.

In testimony whereof I affix my signature in presence of two witnesses.

WILLIAM GROSSKOPF.

Witnesses:
JOSEPH E. CAVANAUGH,
MAX W. ORTMANN.